UNITED STATES PATENT OFFICE 2,554,487

POLYMERIZATION OF ROSIN

David S. Breslow, Wilmington, Del., assignor to Hercules Powder Company, Wilmington, Del., a corporation of Delaware No Drawing. Application March 31, 1949,
Serial No. 84,725

16 Claims. (Cl. 260—99.5)

This invention relates to the polymerization of rosinyl materials and, more particularly, to the polymerization of rosinyl materials by means of catalysts which are free-radical formers.

Rosinyl materials such as rosin and rosin esters have previously been polymerized by means of such catalysts as strong mineral acids, boron trifluoride, and other fluorine compounds, metal halides, etc., but the results have not been entirely satisfactory. The strong mineral acids such as sulfuric acid and phosphoric acid are objectionably corrosive, and sulfuric acid often causes charring and discoloration of the polymerized material. Phosphoric acid has the further disadvantage of not being sufficiently active for an efficient polymerization process. Boron trifluoride is too expensive for general use, inconvenient to handle, and otherwise objectionable. The metal halides such as aluminum chloride, stannic chloride, etc., are not satisfactory because of the difficulty of obtaining an intimate contact between the rosin ester and the metal chloride. Many other disadvantages could be cited for the prior art catalysts used in the polymerization of rosin and rosin esters.

Now in accordance with this invention it has been found that rosinyl materials may be polymerized by heating the rosinyl material with substances known to decompose under the heating conditions to form free radicals and which may be called free-radical formers. Thus, it has been found that free radicals created by decomposition of a free-radical former will react with rosinyl materials to effect a polymerization of the rosinyl material.

In carrying out the process of this invention, the rosinyl material is mixed with the free-radical former and the mixture is heated to a temperature at which the free radicals are formed by decomposition of the free-radical former. The polymerization process increases the softening point of the rosinyl material and when carried out by the process of this invention, the degree of increase in the melting point may be varied by varying the amount of free-radical former added. Thus it is possible to change the properties of the rosinyl material to any desired degree.

The following examples illustrate the process of polymerizing rosinyl materials in accordance with this invention. All parts and percentages given are by weight and the drop softening points are those determined by the Hercules drop melting point method which is well known in the art.

Example 1

To 100 parts of a molten commercial methyl ester of wood rosin heated to 125° C. was slowly added 40 parts of a 30% solution of acetyl peroxide in dimethyl phthalate with rapid dispersion of the solution. The addition of the acetyl peroxide took about 20 minutes and the reaction was somewhat exothermic. After the reaction was complete, the reaction mixture was distilled in vacuo to remove the dimethyl phthalate and any unreacted methyl abietate. The polymerized methyl ester which remained as a residue was a tacky, red solid. A comparison of the commercial ester and the polymerized ester is tabulated below:

|  | Original Ester | Polymerized Ester |
|---|---|---|
| Drop softening point_____°C__ | (¹) | 70 |
| Molecular weight (acetone)_____ | 309 | 490 |

¹ Viscous liquid.

Example 2

To 62.5 parts of a commercial monoethylene glycol ester of wood rosin dissolved in 16 parts of deodorized kerosene and heated to 100° C. was added 10 parts of a 30% solution of acetyl peroxide in dimethyl phthalate during a period of 10 minutes. The temperature of the reaction mixture rose to 120° C. during the addition. After the addition was complete and the reaction had subsided, the reaction mixture was heated at 110° C. for 20 minutes and then was distilled in vacuo (2 mm. pressure; 250° C. bath temperature) to remove the solvents. A comparison between the original ester and the polymerized monoethylene glycol ester is tabulated below:

|  | Original Ester | Polymerized Ester |
|---|---|---|
| Drop softening point_____°C__ | 64 | 69 |
| Acid number_____ | 12.7 | 11.2 |

Example 3

A solution of 50 parts of the pentaerythritol ester of rosin in 50 parts of benzene was heated to 80°–90° C. and 20 parts of a 30% solution of acetyl peroxide in dimethyl phthalate was gradually added. The reaction mixture was heated for 15 minutes after the addition was complete and then was distilled in vacuo to a bath temperature of 250° C. to remove the solvents. The polymerized pentaerythritol ester of rosin had the following properties as compared with the original ester:

|  | Original Ester | Polymerized Ester |
| --- | --- | --- |
| Drop softening point _____°C__ | 113 | 129.5 |
| Acid number_____ | 11.7 | 9.3 |

Example 4

A solution of 50 parts of the pentaerythritol ester of wood rosin in 50 parts of benzene was heated to reflux and 25 parts of 90% benzoyl peroxide was added in small portions to the agitated solution. After the addition was complete, the reaction mixture was distilled in vacuo to a bath temperature of 250° C. The polymerized ester so obtained had the following properties in comparison with the original ester:

|  | Original Ester | Polymerized Ester |
| --- | --- | --- |
| Drop softening point _____°C__ | 113 | 146.5 |
| Acid number_____ | 11.7 | 10.7 |

Example 5

To 50 parts of the pentaerythritol ester of rosin heated to 150° C. was gradually added, with agitation, 25 parts of 70% cumene hydroperoxide with rapid dispersion. After the addition was complete, the reaction mixture was heated at 150° C. for 30 minutes and then was distilled in vacuo to a bath temperature of 250° C. The polymerized pentaerythritol ester of rosin which remained as a residue had the following properties compared with the original ester:

|  | Original Ester | Polymerized Ester |
| --- | --- | --- |
| Drop softening point _____°C__ | 113 | 146 |
| Acid number_____ | 11.7 | 10.8 |

Example 6

To 50 parts of the pentaerythritol ester of rosin heated to 150° C. was gradually added, with agitation, 25 parts of a 60% tert-butyl hydroperoxide, the reaction being carried out in a carbon dioxide atmosphere. The temperature of the reaction mixture was gradually raised to 180° C. The polymerized ester, which remained as a residue after distillation up to a temperature of 250° C., had the following properties in comparison with the original ester:

|  | Original Ester | Polymerized Ester |
| --- | --- | --- |
| Drop softening point _____°C__ | 113 | 135 |
| Acid number_____ | 11.7 | 12.3 |

Example 7

To 50 parts of WW wood rosin heated to 150° C. in an atmosphere of nitrogen was gradually added, with agitation, 33.8 parts of 73.8% cumene hydroperoxide during a 30-minute period. After the addition was complete, the reaction mixture was heated at 150° C. for 30 minutes more and then was distilled in vacuo to a bath temperature of 250° C. The polymerized rosin which remained as a residue had the following properties compared with the original rosin:

|  | Original Rosin | Polymerized Rosin |
| --- | --- | --- |
| Drop softening point _____°C__ | 84 | 113 |
| Acid number_____ | 164 | 149 |

Example 8

Example 7 was repeated except that 50 parts of ester gum (the glycerol ester of rosin) was substituted for the wood rosin used in that example. The polymerized ester gum had the following properties compared with the original ester gum:

|  | Original Ester | Polymerized Ester |
| --- | --- | --- |
| Drop softening point _____°C__ | 100 | 134 |
| Acid number_____ | 10.6 | 7.5 |

Example 9

A mixture of 50 parts of the pentaerythritol ester of rosin and 5 parts of tetraethyllead was heated in an atmosphere of nitrogen at 235° C. for 24 hours. The reaction mixture was then cooled and dissolved in 100 parts of benzene. The benzene solution was filtered, washed with 100 parts of a 5% solution of nitric acid to destroy any unreacted tetraethyllead and finally was washed with water. The benzene was removed by distillation in vacuo up to a bath temperature of 200° C. The polymerized ester had a drop softening point of 121° C. compared with 112° C. for the original ester.

Example 10

A mixture of 50 parts of the pentaerythritol ester of rosin and 10 parts of di-tert-butyl peroxide was heated to and held at a temperature of 100°–120° C. for 24 hours. The reaction mixture was then distilled in vacuo to a bath temperature of 200° C. The polymerized rosin ester which remained as a residue had the following properties compared with the original rosin:

|  | Original Ester | Polymerized Ester |
| --- | --- | --- |
| Drop softening point _____°C__ | 113 | 152 |
| Acid number_____ | 11.7 | 10.6 |

In accordance with this invention, a rosinyl material may be polymerized, and the drop softening point increased thereby, by heating in the presence of a substance which decomposes into free radicals. The above examples illustrate the process of polymerizing rosin or rosin esters with a variety of free-radical formers. These polymerization procedures are equally applicable to other rosinyl materials such as rosin alcohols and their esters, salts of rosin, nitriles of rosin, and rosin oil. Thus any natural rosin or derivatives thereof may be polymerized in accordance with this invention. Rosins which may be so polymerized are French or American gum rosin, any grade of wood rosin including those refined by various methods known to the art, or the pure rosin acids may be used as, for example, abietic acid, pimaric acid, levo-pimaric acid, etc. In addition, salts of rosin acid may be polymerized by the process of this invention. Thus, fusible metal salts of the rosin acids can be made higher melting with the incorporation of less metal when so polymerized. Likewise the nitriles of rosin acids and rosin oil may also be polymerized by means of free-radical formers.

Rosin esters which may be polymerized by this process are the esters of the natural rosins or rosin acids. The rosin ester may be either a monohydric alcohol ester or a polyhydric alcohol ester of rosin. Among the monohydric alcohol esters of rosin which may be polymerized in accordance with this invention are the alkyl rosin esters such as the methyl, ethyl, propyl, butyl, amyl, cetyl, lauryl, stearyl, etc. esters; the aryl rosin esters such as phenyl, benzyl, etc. esters; and other higher molecular weight alcohol esters as the hydroabietyl, furfuryl, cyclohexyl, etc. esters. Polyhydric alcohol esters which may be polymerized include the rosin esters of such alcohols as ethylene glycol, diethylene glycol, trimethylene glycol, propylene glycol, glycerol, trimethylol ethane, pentaerythritol, sorbitol, mannitol, etc. The rosin esters which are used may be completely esterified or they may contain a small amount of unesterified rosin acids. Instead of using a pure rosin ester, mixtures of rosin esters may be employed if desired.

Rosin alcohols or esters of rosin alcohols may also be polymerized in accordance with this invention. When the rosin alcohols, as for example abietyl alcohol, are polymerized with oxidizing free-radical formers, the product is a mixture of the alcohol and corresponding aldehyde in their polymeric forms. Esters of rosin alcohols which may be so polymerized are those of aliphatic, aromatic or cycloaliphatic acids. In the case of these esters dimerization may take place in the acid portion of the molecule as well as in the alcohol portion. For example, abietyl acetate will polymerize in such a manner that the product is a complex mixture due to dimerization through the acetate radical and also through the abietyl portion of the molecule.

Free-radical formers which may be used in the process of this invention include organic peroxides such as acetyl peroxide, propionyl peroxide, benzoyl peroxide and other diacyl peroxides, tert-butyl peroxide, ethyl peroxide, methyl ethyl peroxide and other dialkyl peroxides, dibutyl ether peroxides, ethyl butyl ether peroxide, diisopropyl ether peroxide and other dialkyl ether peroxides; organic hydroperoxides such as ethyl hydroperoxide, tert-butyl hydroperoxide, $a,a$-dimethylbenzyl hydroperoxide, and other alkyl or $a,a$-dialkylarylmethyl hydroperoxides; and aliphatic organometallic compounds which decompose into free radicals under the action of heat, light, or an electric discharge. The most suitable organometallic compounds are those which are decomposed at temperatures below about 350° C. either by heat alone, by light or by electric discharge. The preferred organometallic compounds are the methyl and ethyl organometallic derivatives of lead, zinc, and mercury. The preferred organic peroxides are those having less than about 15 carbon atoms per molecule. Of these, the diacyl peroxides and the di-tert-alkyl peroxides are preferred. The preferred hydroperoxides are the tert-alkyl hydroperoxides such as tert-butyl hydroperoxide and the $a,a$-dialkylarylmethyl hydroperoxides such as cumene hydroperoxide.

The amount of free-radical former required for the polymerization will be dependent upon the amount of polymer it is desired to form, i. e., the desired amount of increase in the softening point of the rosinyl material. Any desired degree of polymerization may be obtained from a slightly polymerized material to a completely polymerized product. The latter products are generally not desired because of their insolubilities, etc. and the partially polymerized products are preferred. Where a certain degree of increase in the softening point of the rosinyl material is desired, it can be effected by the polymerization of only a small part of the rosinyl material and, thus, much less free-radical former than that required for complete polymerization will be used. The exact amount of free-radical former to be used for a given amount of increase in melting point is readily determined by a preliminary test.

The temperature of reaction may be any temperature above about 50° C. and below that at which the product tends to decompose. Thus, temperatures above about 350° C. are generally not used. The preferred temperature range for the reaction using diacyl peroxides is from about 80° C. to about 150° C., for dialkyl peroxides and organic hydroperoxides from about 100° C. to about 200° C., and for the organometallic compounds is from about 200° to about 250° C. The organic lead compounds in general do not form free radicals below about 150° C. without activation.

The free-radical formers are added in such a manner that they are dispersed as rapidly as possible to prevent the free radicals into which they break down from uniting with each other. Excess free-radical former and products of decomposition thereof may be removed if desired in various ways. Excess organic peroxide and by-products formed in its decomposition may be removed by steam sparging and by water washing or by steam sparging alone. Excess metallo-organic compound may be decomposed by washing with small amounts of oxidizing agents such as bromine water or dilute nitric acid. If the free metal is to be removed, this may be done by filtration of a solution of the product through an activated clay, active carbon, and the like.

While the acetyl peroxide used in some of the above examples was used as a solution in dimethyl phthalate, such a solvent is not necessary. The organic peroxide may be added to the rosinyl material by adding such a solution of the peroxide or by adding the peroxide to a solution of the rosinyl material, or it may be added to the latter without the use of a solvent, as by spraying the rosinyl material and peroxide together or by adding excess organic peroxide to the rosinyl material which can then be added to more rosinyl material. Other methods of combining the reactants will be obvious to those skilled in the art and will vary according to the physical properties of the rosinyl material being treated. If solvents are used for carrying out the polymerization reaction, suitable solvents for this purpose are benzene, straight-chain hydrocarbons, and esters of tertiary acids such as methyl benzoate, methyl trimethylacetate, and the like.

The term "rosinyl materials" includes materials derived from rosin which have the $C_{19}H_{29}$ or $C_{19}H_{31}$ nucleus in their structure, said nucleus having a decahydro- or dodecahydro-phenanthrene nucleus in which none of the rings are benzenoid and includes the abietyl compounds and the similar groups of compounds derived from rosin acids isomeric with abietic acid.

The polymerization process in accordance with this invention provides a simple process for increasing the softening point of rosinyl materials by polymerization. The process is a flexible one in that the degree of increase in the softening point may be controlled by varying the amount of free-radical former which is added.

What I claim and desire to protect by Letters Patent is:

1. The process of polymerizing a rosinyl material selected from the group consisting of rosin acids, salts of rosin acids, esters of rosin acids, rosin alcohols, esters of rosin alcohols, rosin nitriles, and rosin oil which comprises heating the rosinyl material with a substance which decomposes into free radicals when heated to a temperature above about 50° C. and below that at which the rosinyl material tends to decompose, the free-radical former being selected from the group consisting of organic peroxides, organic hydroperoxides, and organometallic compounds.

2. The process of polymerizing a rosinyl material selected from the group consisting of rosin acids, salts of rosin acids, esters of rosin acids, rosin alcohols, esters of rosin alcohols, rosin nitriles, and rosin oil which comprises heating the rosinyl material with an organic peroxide to a temperature within the range of about 50° C. and about 350° C.

3. The process of polymerizing a rosinyl material selected from the group consisting of rosin acids, salts of rosin acids, esters of rosin acids, rosin alcohols, esters of rosin alcohols, rosin nitriles, and rosin oil which comprises heating the rosinyl material with an organic hydroperoxide to a temperature within the range of about 50° C. and about 350° C.

4. The process of polymerizing a rosinyl material selected from the group consisting of rosin acids, salts of rosin acids, esters of rosin acids, rosin alcohols, esters of rosin alcohols, rosin nitriles, and rosin oil which comprises heating the rosinyl material with an organometallic compound which decomposes into free radicals when heated to a temperature above about 50° C. and below that at which said material tends to decompose.

5. The process of polymerizing a rosin ester which comprises heating the rosin ester with an organic peroxide at a temperature within the range of about 50° C. and about 350° C.

6. The process of polymerizing a rosin ester which comprises heating the rosin ester with an organic hydroperoxide at a temperature within the range of about 50° C. and about 350° C.

7. The process of polymerizing a rosin ester which comprises heating the rosin ester with an organometallic compound which decomposes into free radicals when heated to a temperature within the range of about 50° C. and about 350° C.

8. The process of polymerizing a rosin ester which comprises heating the rosin ester with a diacyl peroxide at a temperature within the range of about 50° C. and about 350° C.

9. The process of polymerizing a rosin ester which comprises heating the rosin ester with di-tert-alkyl peroxide at a temperature within the range of about 50° C. and about 350° C.

10. The process of polymerizing a rosin ester which comprises heating the rosin ester with a tert-alkyl hydroperoxide at a temperature within the range of about 50° C. and about 350° C.

11. The process of polymerizing a rosin ester which comprises heating the rosin ester with an $\alpha,\alpha$-dialkylarylmethyl hydroperoxide at a temperature within the range of about 50° C. and about 350° C.

12. The process of polymerizing a rosin ester which comprises heating the rosin ester with tert-butyl peroxide at a temperature within the range of about 100° C. and about 200° C.

13. The process of polymerizing a rosin ester which comprises heating the rosin ester with tert-butyl hydroperoxide at a temperature within the range of about 100° C. and about 200° C.

14. The process of polymerizing a rosin ester which comprises heating the rosin ester with $\alpha,\alpha$-dimethylbenzyl hydroperoxide at a temperature within the range of about 100° C. and about 200° C.

15. The process of polymerizing a rosin ester which comprises heating the rosin ester with acetyl peroxide at a temperature within the range of about 80° C. and about 150° C.

16. The process of polymerizing a rosin ester which comprises heating the rosin ester with tetraethyllead at a temperature within the range of about 200° C. and about 250° C.

DAVID S. BRESLOW.

REFERENCES CITED

The following references are of record in the file of this patent:

UNITED STATES PATENTS

| Number | Name | Date |
|---|---|---|
| 2,108,928 | Rummelsberg | Feb. 22, 1938 |

OTHER REFERENCES

Berkman et al., "Catalysis," Rheinhold Publishing Co., 1940, p. 960.